No. 782,395.           PATENTED FEB. 14, 1905.
A. F. HEROD.
DOUBLE SHOVEL PLOW.
APPLICATION FILED SEPT. 23, 1904.
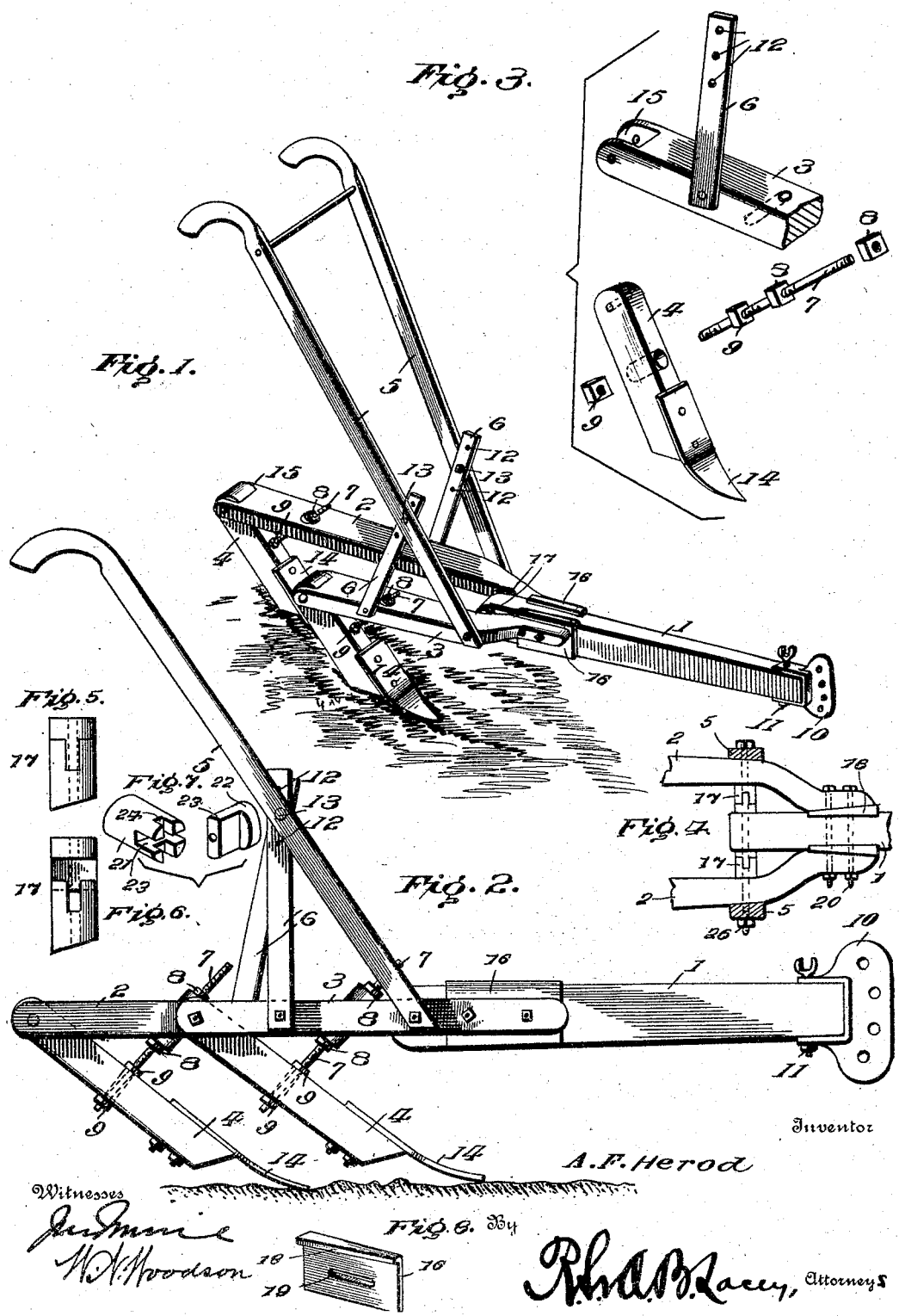
Inventor
A. F. Herod
By R. & A. B. Lacey, Attorneys
Witnesses No. 782,395. Patented February 14, 1905.

UNITED STATES PATENT OFFICE.

ALFRED F. HEROD, OF NORTH SPRINGS, TENNESSEE.

DOUBLE-SHOVEL PLOW.

SPECIFICATION forming part of Letters Patent No. 782,395, dated February 14, 1905.

Application filed September 23, 1904. Serial No. 225,664.

*To all whom it may concern:*

Be it known that I, ALFRED F. HEROD, a citizen of the United States, residing at North Springs, in the county of Jackson and State of Tennessee, have invented certain new and useful Improvements in Double-Shovel Plows, of which the following is a specification.

This invention appertains to agricultural implements of the type designed chiefly for cultivating and tilling the soil, and aims to provide a device for the purpose aforesaid which will operate equally well in rich or poor soil, and particularly in land abounding in gravel.

The invention aims to devise an implement of simple construction and capable of adjustment to admit of changing the pitch of the teeth or shovel-blades according to the nature of the soil and the character of the work, whereby the cultivation may be deep or shallow, as desired.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a perspective view of a double-shovel plow constructed in accordance with and embodying the essential features of the invention. Fig. 2 is a side view thereof. Fig. 3 is a detail perspective view of the rear portion of a beam, a standard, a handle-bar, brace, and the means adjustably connecting the standard with the beam, the parts being separated and arranged in a group. Fig. 4 is a top plan view of the proximal ends of the stock and beams, showing the intermediate spacing devices and the connecting means. Figs. 5, 6, and 7 are detail views of a set of spacers, showing the different relative positions of the complemental parts. Fig. 8 is a detail perspective view of a wedge.

Corresponding and like parts are referred to in the following description and indicated in all the views of the drawings by the same reference character.

The implement in its general structure comprises a stock 1, companion beams 2 and 3, standards 4, handle-bars 5, braces 6, and adjustable connections between the standards and beams, the same consisting of threaded rods 7 and pairs of set-nuts 8 and 9, the latter embracing opposite sides of the standard and the former embracing opposite sides of the beam.

The stock 1 is provided at its front end with a clevis 10, connected thereto by means of a bolt or pin 11, which is forked at one end to provide a wrench or spanner for turning the nuts coöperating with the rods 7 or the bolts employed for connecting the parts when assembled. The clevis 10 has its forward portion provided with a vertical series of openings to enable application of the draft at any required point. The beams 2 and 3 are transversely spaced and their foward ends are arranged upon opposite sides of the rear part of the stock 1 and are bolted or otherwise secured thereto. The handle-bars 5 are pivotally connected at their lower ends to the front portion of the beams and are stayed by means of the braces 6, which are pivotally connected at their lower ends to said beams and have adjustable connection at their upper ends with the handle-bars. As shown, the braces 6 are provided with a series of openings 12, through any one of which bolts or like connections 13 are adapted to be passed for securing the braces to the handle-bars in the required adjusted position.

The standards 4 are similarly constructed and are provided at their lower ends with shovel-blades 14 of any desired pattern or make, according to the nature of the soil or particular work. The standards are pivotally connected at their upper ends to the rear extremities of the respective beams to admit of the pitch or inclination of the shovels 14 being regulated to meet special requirements. As shown, the rear end of each beam is cut away at 15 to receive the upper ends of the standard, which is pivotally connected thereto in any substantial manner. A brace-rod 7 connects each standard with its respective beam and receives pairs of set-nuts 8 and 9, which are disposed substantially as illustrated. By proper manipulation of the set-nuts, the inclination of the standards may be varied, so that the pitch of the shovels may be regulated as required to facilitate regulating the depth of cultivation. The elevation of the grips of the handle-bars may be regulated by disconnecting the braces 6 at their upper ends from the handle-bars and moving the latter upon their pivotal connections with the beams to bring the grips at their required height, after which the braces 6 are connected to the handle-bars by the bolts or fastenings 13. One of the bolts, as 13, is shorter than the other, thereby throwing the standards and plow-points of the shovels in advance of each other, which is of advantage in the manner well understood in the art.

To admit of lateral adjustment of the beams 2, so as to space the shovels apart a greater or less distance, spacing devices are interposed between the stock 1 and the forward ends of the beams 2. These spacing devices consist of wedges 16 and blocks 17. The wedges 16 are flanged at their upper edges, as shown at 18, to overlap the stock 1 to assist in maintaining them in proper position and to give proper direction in their longitudinal adjustment. Each wedge is formed with a longitudinal slot 19, through which the bolts or fastenings 20 pass. The spacers 17 are located in the rear of the spacers 16 and may constitute fulcra for the beams 2 when using the wedges 16 for adjusting the front ends of the beams. The spacers 17 are adjustable, so as to be lengthened or shortened to vary the distance between the stock 1 and the beams 2. Each spacer 17 is composed of blocks 21 and 22. One of the blocks, as 22, has a tongue 23 at its inner end, and the other block is formed in its end with intersecting grooves 24 and 25 of different depths for reception of the tongue 23. The blocks 21 and 22 are centrally bored to receive a bolt or fastening 26, by means of which the beams 2 and stock 1, as well as the handle-bars 5, are connected. When it is required to vary the distance between the shovels or to adapt the implement for shovels of different widths, the beams 2 may be spread more or less at their rear ends, either by longitudinal adjustment of the spacers 16 or by lengthening or shortening the spacers 17 or by a combined adjustment of both sets of spacers. When the bolt or fastening 26 is loosened to admit of separating the blocks 21 and 22 to permit the tongue 23 to clear the grooves of the block 21, one or the other of said blocks may be turned to admit the tongue 23 entering the groove of proper depth, so as to secure the proper lengthening of the spacers and lateral adjustment of the beam. After the adjustment has been effected the fastenings 26 and 20 are retightened.

Having thus described the invention, what is claimed as new is—

In an agricultural implement, the combination of coöperating parts relatively adjustable, a fastener for connecting said parts, and a spacer interposed between said parts, mounted upon the fastenings and comprising complemental members, one of the members having a tongue and the other intersecting matching grooves of different depths, substantially as set forth.

In testimony whereof I affix my signature in presence of two witnesses.

ALFRED F. HEROD. [L. S.]

Witnesses:
J. B. BIRDWELL,
J. T. HEROD.